(12) United States Patent
Lalande et al.

(10) Patent No.: US 6,908,507 B2
(45) Date of Patent: Jun. 21, 2005

(54) PROCESS AND A PLANT FOR THE PRODUCTION OF PORTLAND CEMENT CLINKER

(75) Inventors: Jean-Marie Lalande, Lévis (CA); Anne Tremblay, Beauport (CA)

(73) Assignee: CO2 Solution Inc., Quebec (CA)

( * ) Notice: Subject to any disclaimer, the term of this patent is extended or adjusted under 35 U.S.C. 154(b) by 19 days.

(21) Appl. No.: 10/474,930

(22) PCT Filed: Apr. 12, 2002

(86) PCT No.: PCT/CA02/00517

§ 371 (c)(1),
(2), (4) Date: Oct. 14, 2003

(87) PCT Pub. No.: WO02/083591

PCT Pub. Date: Oct. 24, 2002

(65) Prior Publication Data

US 2004/0129181 A1 Jul. 8, 2004

Related U.S. Application Data

(60) Provisional application No. 60/283,327, filed on Apr. 13, 2001.

(51) Int. Cl.[7] .................................................. C04B 7/36
(52) U.S. Cl. ...................... 106/739; 106/745; 106/761; 106/762; 432/14; 110/345
(58) Field of Search ................................ 106/739, 745, 106/761; 432/14; 110/345

(56) References Cited

U.S. PATENT DOCUMENTS

| | | |
|---|---|---|
| 3,925,534 A | 12/1975 | Singleton et al. ........... 423/208 |
| 4,602,987 A | 7/1986 | Bonaventura et al. ...... 205/633 |

(Continued)

FOREIGN PATENT DOCUMENTS

| | | |
|---|---|---|
| CA | 1143910 | 4/1983 |
| CA | 2222030 | 12/1996 |

(Continued)

OTHER PUBLICATIONS

Emission Reduction of Greenhouse Gases from the Cement Industry, C.A. Hendriks, E. Worrell, D. de Jager, K. Blok, and P. Riemer.

The Cement Production Process, Cement Industry Federation.

Composition and properties of cement, MPC, Global Network of Construction, copyright 2000–2001 MPC, MarketPlaceConstruction, Global Cement Information System.

(Continued)

Primary Examiner—Paul Marcantoni

(57) ABSTRACT

A process is disclosed for producing cement clinker, comprising the steps of: a) providing a mixture of ground calcareous materials and ground argillaceous materials; b) heating the mixture of step a) to a temperature sufficient to calcine and fuse the ground materials to form the cement clinker, and thereby producing an exhaust gas containing $CO_2$; c) catalysing the hydration of at least a portion of the CO2 contained in the exhaust gas and producing a solution containing bicarbonate ions and hydrogen ions; and d) adding to the solution obtained in step c) metal ions, and adjusting the pH of the solution to precipitate a carbonate or said metal. Preferably, the metal ions are $Ca^{++}$ obtained from the dissolution of a material selected from the group consisting of $CaCl_2$, cement kiln dust and sea salts and the carbonate is $CaCO_3$ which is advantageously recycled into the process by adding the $CaCO_3$ to the mixture of step a). A cement plant for performing this process is also disclosed.

18 Claims, 1 Drawing Sheet

U.S. PATENT DOCUMENTS

| | | | | |
|---|---|---|---|---|
| 4,743,545 | A | 5/1988 | Torobin | 435/41 |
| 4,761,209 | A | 8/1988 | Bonaventura et al. | 205/633 |
| 5,293,751 | A | 3/1994 | Asai | 62/53.1 |
| 5,304,356 | A | 4/1994 | Iijima et al. | 422/226 |
| 5,364,611 | A | 11/1994 | Iijima et al. | 423/437.1 |
| 5,614,378 | A | 3/1997 | Yang et al. | 435/41 |
| 5,667,561 | A | 9/1997 | Suzuki et al. | 95/139 |
| 5,744,078 | A | 4/1998 | Soroushian | 264/82 |
| 5,766,339 | A | 6/1998 | Babu et al. | 106/745 |
| 5,888,256 | A | 3/1999 | Morrison | 44/552 |
| 6,110,370 | A | 8/2000 | Van Hille et al. | 210/602 |
| 6,117,404 | A | 9/2000 | Mimura et al. | 423/228 |
| 6,143,556 | A | 11/2000 | Trachtenberg | 435/289.1 |
| 6,187,277 | B1 | 2/2001 | Kirschner | 423/220 |
| 6,240,859 | B1 | 6/2001 | Jones | 110/345 |
| 6,248,795 | B1 | 6/2001 | Jun et al. | 518/713 |
| 6,258,335 | B1 | 7/2001 | Bhattacharya | 423/213.2 |
| 6,524,843 | B1 | 2/2003 | Blais et al. | 435/266 |

FOREIGN PATENT DOCUMENTS

| | | |
|---|---|---|
| CA | 2291785 | 12/1998 |
| CA | 2352969 | 5/2000 |
| CA | 2255287 | 6/2000 |
| DE | 3218232 | 2/1984 |
| DE | 3729695 | 3/1988 |
| DE | 4032557 | 4/1992 |
| EP | 0991462 | 4/2000 |
| FR | 2669918 | 6/1992 |
| GB | 384060 | 12/1932 |
| GB | 587101 | 4/1947 |
| GB | 103290 | 3/2001 |
| JP | 58 208117 | 12/1983 |
| JP | 02 000699 | 1/1990 |
| JP | 06 263665 | 9/1994 |
| JP | 07 068164 | 3/1995 |
| JP | 09110485 | 4/1997 |
| JP | 09 168775 | 6/1997 |
| JP | 10130045 | 5/1998 |
| JP | 10 314758 | 12/1998 |
| JP | 11 235999 | 8/1999 |
| JP | 2000 072981 | 3/2000 |
| JP | 2000 119049 | 4/2000 |
| JP | 2000 239670 | 9/2000 |
| JP | 2000 300983 | 10/2000 |
| JP | 2001 039751 | 2/2001 |
| WO | WO9200380 | 1/1992 |
| WO | WO9524959 | 9/1995 |
| WO | WO9855210 | 12/1998 |
| WO | WO9966260 | 12/1999 |

OTHER PUBLICATIONS

How Cement is Made, copyright Castle Cement 1998.

Cement and Concrete: Environmental Considerations, Environmental Building News, vol. 2, No. 2, Mar./Apr. 1993.

Manufacturing Cement, Manufacturing Portland Cement, Portland Cement Association.

The Cement Industry, Economics, www.portcement.org/indecon.

The Cement Industry, A History of Cement, www.portcement.org/indhist.

Why cement–making produces carbon dioxide, last revised in May 1993 by the Information Unit on Climate Change, Switzerland.

PROCESS AND A PLANT FOR THE PRODUCTION OF PORTLAND CEMENT CLINKER

CROSS-REFERENCE TO RELATED APPLICATIONS

This application is the U.S. national stage of International Application PCT/CA02/0057 filed Apr. 12, 2002 published Oct. 24, 2002 in English (International Publication No. WO 02/083591 Al) and claiming priority from U.S. provisional application Ser. No. 60/283,327 filed Apr. 13, 2001.

FIELD OF THE INVENTION

The present invention relates generally to the field of processes and apparatuses for the production of Portland cement clinker. More specifically, it concerns a process and a plant for the recovery and recycling of the carbon dioxide emissions from the production of Portland cement clinker.

BACKGROUND

Preserving the environment goes above all through the recognition of polluting agents, a list stretching out every year. Carbon dioxide is a by-product of many industrial chemical reactions and is considered polluting only of late. Until recently still, it was rather seen as a consequence of no gravity from the combustion of carbonated compounds such as coal and petroleum, or else, as a desired final product in the control of gaseous emissions.

Accumulation of evidences as to the participation of $CO_2$ in the greenhouse effect responsible for earth's global warming revealed a problematic of extreme urgency. On this account, international engagements proposed in Kyoto (Kyoto protocol, 1997) have commanded for active research in reducing greenhouse effect gases, particularly $CO_2$.

Amongst the finger pointed industries, cement fabrics account for 8% of the $CO_2$ planetary anthropic emissions. Portland cement is made of lime, alumina, iron and silica. This mixture is pulverized and fused together by burning at high heat (more than 1,400° C.) in a rotary kiln. Combining the resulting material, called "clinker", with gypsum, results in the production of a fine powder known as Portland cement. In the production process, carbon dioxide emissions come from fossil fuel combustion and a calcination stage of limestone ($CaCO_3$).

Portland cement is the binding agent that enables the formation of concrete, which will also include aggregates, air and water.

Portland cement is the result of a chemical combination of calcium (usually from limestone), silica (clay, sand and shale), alumina (bauxite), iron (ore) and small amounts of various chemicals called admixtures to which gypsum is added at the last grinding in order to control the cement setting process.

The production of one tonne of cement (2000) requires close to 3 500 tonnes of raw materials. Lime and silica account for approximately 85% of the weight.

Two main categories of production processes are in use in this industry: the dry process kiln (70% in the U.S.) and the wet process kiln (older). For both processes, the first step is similar. The raw materials are crushed for reduction to about 3 inches or smaller. In the wet process, the raw materials, properly proportioned, are then ground with water, thoroughly mixed in the form of slurry. In the dry process, raw materials are ground and mixed in a dry state. In both processes, the slurry or the dry material is fed to a rotary kiln inclined slightly form the horizontal where it is heated to more than 1,400° C.

A rotary kiln is frequently as much as 12 feet in diameter and 400 feet long.

The "raw meal" is fed into the higher end of the kiln and progresses to the lower end, moved by the rotation. On its way down, the "raw meal" is facing a burner blowing its flame under an upward forced draft.

At the lower end, the new substance, called clinker, is formed in pieces about the size of marbles. The heat is recuperated from the cooling of the red-hot clinker and returned to the kiln. The clinker remains to be ground into fine powder to which some gypsum is added to form cement.

Cement is then put in bags or carried in bulk to ready mix plants. Concrete is produced by mixing cement with fine (sand) or coarse aggregates (gravel or crushed stone) and water. Often, some chemicals are added to control setting time and plasticity.

The first important reaction to occur is the calcining of limestone (calcium carbonate $CaCO_3$) into lime (calcium oxide CaO) and carbon dioxide ($CO_2$) at a temperature of 1 650° F. (900° C.).

The second reaction is the bonding of calcium oxide and silicates to form calcium silicates. Small amounts of calcium aluminate and calcium aluminoferrite are also formed. The relative proportions of these compounds determine the key properties of the resultant Portland cement and the type classification.

Cement Kiln Dust (CKD)

Cement Kiln Dust (CKD), a fine granular material generated during cement production, is carried up by the combustion gases. The CKD is normally removed and collected by an air pollution control system. The collected CKD which is mainly made up of lime (CaO), $K_2O$, $SO_3$, silica ($SiO_2$) and alumina ($Al_2O_3$) may be returned into the process or stocked.

The US Environmental Protection Agency published a report on the forseeable costs of conforming to future regulations on CDK dust (EPA, 1998). Among the interesting information published in this report, is the ratio of CDK production relative to clinker production depending on Kiln type (Table 1). As it can be appreciated, wet processes generate a greater production of CKD (between 11 and 17%).

TABLE 1

Average CKD production vs clinker production depending on Kiln type

| Kiln Type | Mean CKD/clinker production |
|---|---|
| Non-hazardous fuel kiln | |
| Dry process | 0.060 |
| Dry preheating | 0.024 |
| Wet process | 0.107 |
| Hazardous fuel kiln | |
| Dry process | 0.061 |
| Dry preheating | 0.038 |
| Wet process | 0.166 |

The net CKD refuse (excluding CKD regenerated during the process) output by 110 US cement plants is approximately 3,3 million tonnes per year.

In the above-mentioned EPA study, the baselines and the costs relating to conforming to future regulations were calculated for every affected plant. The total before-tax baseline costs, the initial conformity costs and the annual conformity costs respectively amount to 54,9; 98,5 and 43,7 millions US$. Out of 110 US plants, 68 (62%) would incur average annual costs of 646 000 US$, translating to 19,96 US$ per CKD tonne and 1,12 US$ per cement tonne produced. The total annual income for these 68 cement plants is estimated at 2,945 billion US$. The cost of conforming to regulations would therefore represent 1,5% of their income.

$CO_2$ emissions from cement Portland production $CO_2$ emissions produced by cement production come from two sources:

1. Fossil fuel combustion required to heat the raw meal—6 millions BTUs/tonne of cement produce ¾ tonne of $CO_2$.
2. Calcining of limestone into lime—½ tonne of $CO_2$/ tonne of cement.

In Canada, one tonne of cement generates 0.5 tonne of $CO_2$ from limestone conversion and about 0.35 tonne of $CO_2$ from the combustion of fossil products, for a total of 0.85 tonne of $CO_2$ for each tonne of cement produced.

The very high temperatures required for cement production allow for burning all sorts of materials such as solvents, paint, and tires. At these temperatures, the combustion is complete and pollution is reduced to a minimum.

The methods already known in the art for reducing $CO_2$ emissions are the improvement of the energy efficiency of the process, the replacement of high carbon fuels by low carbon fuels, the use of waste as alternative fuel, the use of industrial waste containing lime and the use of fly ash to replace cement (15 to 35%) in concrete. Fly ash is a by-product of the combustion of pulverized coal in thermal power plants.

Literature abounds with a good number of processes destined to reducing carbon dioxide emissions by the cement industry. U.S. Pat. No. 6,240,859; GB587101; U.S. Pat. No. 5,744,078 propose above all an improvement of combustion efficiencies and recycling of fly ashes as cement additive. Patent DE4032557 suggests a method of handling aggregates and cement claiming improved energetic efficiency and in this way, preventing, $CO_2$ discharge by cement fabrics. Patent JP09-110485 uses absorption and volatilization of $CO_2$ to produce energy. Finally, European patent WO9966260 advises reutilization of industrial exhaust gas, thus achieving improved combustion efficiency.

Japanese patent 10-130045 discloses cement waste recycling in the fabrication of regenerated cement, by the way claiming a reduction of $CO_2$ emissions in the environment. As a matter of fact, combined recycling of $CO_2$ and manufacture residues is often invoked as a means for reducing cementous polluting waste (JP2000-239670; JP2000-119049; JP09-168775). In some configurations (U.S. Pat. No. 6,187,277; JP07-068164; JP2000-300983), recycled solid materials can be directly used for carbon dioxide fixation of industrial gas exhausts. Another Japanese patent (JP10-314758) was-conceived so that $CO_2$ from the gaseous effluent of ceramic industries can be eliminated by introduction of residual water in cement plants.

CA1143910 describes a method allowing the use of $CO_2$ from a waste flue gas and some waste material for manufacturing an asbestos free fibre reinforced cement. A European untitled document (GB103290) also expects recycling of $CO_2$ for Portland cement manufacturing, in the same way as patent GB384060, which particularly uses a simple valve to isolate produced $CO_2$ from other flue gases during the process.

Another way of reducing industrial $CO_2$ emissions consists of transforming this gas to synthesis products of commercial value. Patent JP2000-072981 suggests carbon black production by utilizing exhaust gas in cement production through $CO_2$ catalytic fixation whilst another (JP58-208117) allows for the manufacture of liquefied carbon dioxide from the waste gas of cement calcining kiln. Patent JP06-263665 deals with catalytic hydrogenation of carbon dioxide gas exhausted from cement factories for the production of chemicals such as methane and methanol.

A totally different approach preaches cement admixtures and compositions giving low loads on the environment and discharging smaller amounts of carbon dioxide, as it is the case for patents FR2669918 and JP2001-039751.

Currently, many scripts emanate from scientists with the purpose of reducing $CO_2$ emissions in general. Sinking $CO_2$ in the seawater over the deep ocean floor (U.S. Pat. No. 5,364,611; U.S. Pat. No. 5,304,356; U.S. Pat. No. 5,293,751) persists amongst the main considerations despite the many uncertainties and inconveniences associated with this method. Chemical fixation (CA 2352969) and selective adsorption of $CO_2$ (U.S. Pat. No. 5,667,561; JP02-000699) also stand amongst favoured methods in the literature. Membrane separation (JP11-235999) and chemical conversion in ether or methanol (U.S. Pat. No. 6,248,795) offer interesting possibilities as well. One cannot help, but conclude exhaust gas absorption (U.S. Pat. No. 6,117,404; CA2255287; U.S. Pat. No. 5,888,256) remains one of the most promising methods and the very solubilization of concerned gases constitute the corner stone of all innovations in that field.

With this perspective, carbonic anhydrase has already been used for waste water treatment (U.S. Pat. No. 6,110,370) and recently, for reducing $CO_2$ emissions in enzymatic photobiorectors (U.S. Pat. No. 5,614,378). Carbonic anhydrase is a highly reactive enzyme observed in most animal and vegetal species and thus, readily available. Trachtenberg (U.S. Pat. No. 6,143,556; CA 2222030) describes a system for gas processing with carbonic anhydrase without suggesting any specific application for cement fabrics. Michigan University introduced a photobioreactor for the conversion of $CO_2$ with carbonic anhydrase, however destined to medical use as an artificial lung for life support (WO 9200380; U.S. Pat. No. 5,614,378).

U.S. Pat. No. 6,258,335 unveiled a catalytic process for carbon dioxide removal of ice exhaust by chemical fixation. This technology includes the optional use of carbonic anhydrase without particular consideration for cement plants. U.S. Pat. No. (4,743,545) exposed a bioreactor with hollow beads including catalyst, the latter being carbonic anhydrase if needed.

U.S. Pat. No. 4,602,987 and U.S. Pat. No. 4,761,209 disclose a method for extraction and utilization of oxygen from fluids. This system conceived for oxygen recovering especially includes a step for carbon dioxide removal by carbonic anhydrase ( ).

EP0991462; AU7753398; WO9855210; CA2291785 in the name of the Applicant propose a countercurrent packed column bioreactor for treating carbon dioxide. In this process, carbonic anhydrase is used immobilized or in a free state.

Although a great deal of efforts have been made to reduce in general, the is greenhouse effect caused by the emissions of $CO_2$, there is still a need for further improvements and that mainly in the field of cement clinker production.

SUMMARY OF THE INVENTION

An object of the present invention is to satisfy the above-mentioned need.

According to the present invention, there is provided a process for producing cement clinker, comprising the steps of: a) providing a mixture of ground calcareous materials and ground argillaceous materials; b) heating the mixture of step a) to a temperature sufficient to calcine and fuse the ground materials to form the cement clinker, and thereby producing an exhaust gas containing $CO_2$; c) catalysing the hydration of at least a portion of the $CO_2$ contained in the exhaust gas and producing a solution containing bicarbonate ions and hydrogen ions; and d) adding to the solution obtained in step c) metal ions, and adjusting the pH of the solution to precipitate a carbonate of said metal.

As can be appreciated, the process according to the invention allows the carbon dioxide emissions from the production of cement clinker to be greatly reduced and even eliminated by simply catalysing the hydration of $CO_2$ into a solution of bicarbonate ions and hydrogen ions. The bicarbonate ions are then reacted with metals ions to precipitate a carbonated metal harmless to the environment.

The hydration is preferably performed in the presence of an enzyme capable of catalysing the hydration of dissolved $CO_2$ into hydrogen ions and bicarbonate ions. The enzyme is preferably carbonic anhydrase or an analogue thereof.

Also preferably, the metal ions are Ca++ and the carbonate is $CaCO_3$. In such a case, the process preferably comprises after step d), the step of: e) recycling the $CaCO_3$ obtained in step d) into the process by adding the $CaCO_3$ to the mixture of step a). Also in this case, the ions Ca++ are preferably obtained from the dissolution of a material selected from the group consisting of $CaCl_2$, cement kiln dust and sea salts.

According to another preferred aspect, step c) of catalisation comprises the steps of: feeding liquid $H_2O$ and at least a portion of the exhaust gas into a bioreactor containing therein a reaction chamber filled with said carbonic anhydrase immobilized on a support.

As can be appreciated, the process according to this preferred embodiment allows reduction of $CO_2$ emissions at the source through a recycling loop integrated into the cement plant. The loop mainly consists of gas/liquid $CO_2$ packed column absorption catalyzed by an immobilized enzyme (carbonic anhydrase) for the subsequent production of calcium carbonate ($CaCO_3$). The loop is completed when the calcium carbonate is used as first class raw material for the fabrication of Portland cement.

According to this preferred aspect, the process has the advantages of recycling the $CO_2$ into the process and providing a first class raw material for the production of the cement clinker.

The calcareous materials are preferably selected from the group consisting of limestone, marine shells and marl, and the argillaceous materials are preferably selected from the group consisting of clay, slate, sand, shale, and blast-furnace slags.

Also preferably, the mixture of step a) further comprises one or more material selected form the group consisting of aluminium, iron and chemical admixture.

According to the present invention, there is also provided a plant for producing cement clinker, comprising: a kiln for burning raw materials suitable for producing cement clinker, the kiln having an inlet for receiving the raw materials, an outlet for discharging the cement clinker and a gas outlet for discharging an exhaust gas containing $CO_2$. The plant also comprises means for catalysing the hydration of the $CO_2$ contained in the exhaust gas into bicarbonate ions and hydrogen ions; and means for reacting the bicarbonate ions with metal ions to precipitate the carbonate of said metal.

The metal ions are preferably Ca++ and the carbonate is preferably $CaCO_3$. In such a case, the plant preferably further comprises means for transferring the precipitate $CaCO_3$ into the inlet of the kiln.

According to a preferred aspect of the invention, the means for catalysing the hydration of the $CO_2$ comprises a bioreactor comprising a gas inlet for receiving at least a portion of the exhaust gas from the kiln; a liquid inlet for receiving an aqueous liquid, a reaction chamber in fluid communication with the gas inlet and the liquid inlet, the reaction chamber containing therein immobilized enzymes capable of catalysing the hydration of dissolved $CO_2$ into bicarbonate ions and hydrogen ions; and a liquid outlet in fluid communication with the reaction chamber for discharging a solution of bicarbonate ions and hydrogen ions.

The means for reacting the bicarbonate ions with metal ions is preferably a reaction reservoir.

Also preferably, the plant comprises cleansing means for cleansing the exhaust gas; means for transferring the exhaust gas from the kiln to the cleansing means; and means for transferring the clean exhaust gas from the cleansing means to the catalysing means.

The objects, advantages and other features of the present invention will become more apparent upon reading of the following non restrictive description of the preferred embodiment thereof, given for the purpose of exemplification only with reference to the accompanying drawings.

DESCRIPTION OF A PREFERRED EMBODIMENT

Figure 1:
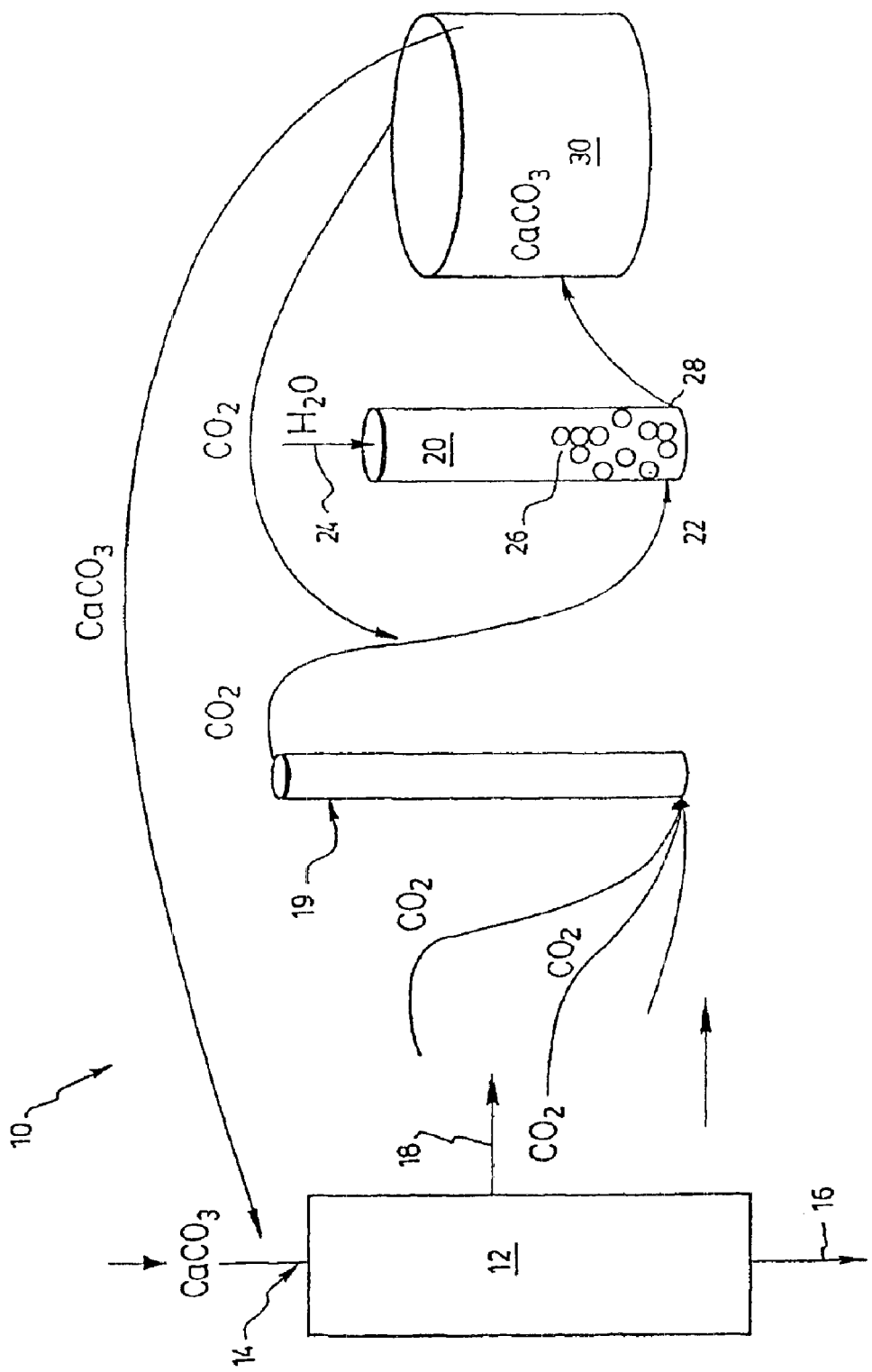
FIG. 1 is a schematic flow chart of a process according to the invention.

The process according to a preferred embodiment of the invention comprises a step where the $CO_2$ emissions from the rotary kiln used in the cement production are transformed into bicarbonate ions by contacting the $CO_2$ gas emissions with an aqueous liquid in a bioreactor containing enzymes capable of catalysing the hydration of $CO_2$ into hydrogen and bicarbonate ions, and then reacting the bicarbonate ions with calcium ions so as to precipitate calcium carbonate ($CaCO_3$) and recycling the same as a first class raw material in the rotary kiln used for producing the Portland cement clinker. The enzyme used is preferably carbonic anhydrase, and it is used free or immobilized on an appropriate support.

Gaseous $CO_2$, considered the greatest contributor to the greenhouse effect, comes from the respiration of living organisms, fuel combustion and certain chemical reactions such as fossil fuel reforming. The $CO_2$ produced by the two latter sources may be enzymatically treated with the enzymatic system described in WO9855210 in the name of the applicant. This enzymatic system is a process for the transformation of gaseous $CO_2$ into bicarbonate and hydrogen ions. The transformation reaction, usually a slow naturally occurring process, is catalyzed by an immobilized or free state enzyme in a specially made reactor. The enzymatic process catalyzes the hydration of dissolved carbon dioxide. The subsequent ionization equilibrium reaction produces bicarbonate and hydrogen ions. The following equations describe the relevant process:

Hydration: dissolved $CO_2 \rightarrow H_2CO_3$      Equation 1

Ionization: $H_2CO_3 \rightarrow H^+ + HCO_3^- \rightarrow CO_3^{2-} + H^+$      Equation 2

The carbonate ions, among others, are precipitated with calcium ions or others into carbonated mineral form.

Detailed Description of a Plant According to a Preferred Embodiment of the Invention Referring to FIG. 1, the plant (10) for the production of cement clinker comprises a kiln schematically represented as box (12) for burning raw materials suitable for producing cement clinker. As commonly used in the production of cement clinker, the raw materials comprise calcareous (lime-bearing) and argillaceous (claylike) materials. The calcareous material may be quarried limestone, dredged marine shells or marl. The argillaceous materials could be clay, slate, shale, or special blast-furnace slags. As in a typical mill, the raw materials are preferably pulverized and handled either as wet suspension or as dry solids. The plant of the invention may use a dry process or a wet process, In the dry process, the pulverized materials are dried in a kiln drier and mixed in the proper proportion. In a wet process, the materials are processed as a wet slurry.

The kiln (12) has an inlet (14) for receiving the raw materials, an outlet (16) for discharging the cement clinker and a gas outlet (18) connected to a chimney stack (19) for discharging an exhaust gas containing $CO_2$.

The plant (10) further comprises a bioreactor (20) for catalysing the hydration of the $CO_2$ contained in the exhaust gas into bicarbonate ions and hydrogen ions. The biorector (20) is preferably as described in WO9855210 in the name of the applicant. It has a gas inlet (22) for receiving at least a portion of the exhaust gas, preferably all the exhaust gas from the kiln (10) and a liquid inlet (24) for receiving an aqueous liquid. Although any liquid containing water could be used, it is easier to simply use water. The bioreactor (20) further includes a reaction chamber (26) in fluid communication with the gas inlet (22) and the liquid inlet (24), the reaction chamber (26) containing therein enzymes capable of catalysing the hydration of dissolved $CO_2$ (meaning aqueous $CO_2$) into bicarbonate ions and hydrogen ions. The enzymes may be in a free state or it may be immobilized on appropriate supports. A liquid outlet (28) in fluid communication with the reaction chamber (26) is provided for discharging a solution of bicarbonate ions and hydrogen ions.

The plant (10) further comprises means, preferably a reaction reservoir (30), for reacting the bicarbonate ions obtained in the bioreactor (20) with metal ions to precipitate a carbonate of said metal.

According to a preferred aspect, the bicarbonate ions are reacted with Ca++ ions obtained by the dissolution in the reservoir (30) of a material selected from the group consisting of $CaCl_2$, cement kiln dust and sea salts. In such a case, the precipitate obtained, $CaCO_3$, is advantageously recycled in the process as a raw material fed to the kiln (10). As will be apparent for any person in the field, the plant (10) in such as case comprises means for transferring the precipitate $CaCO_3$ into the inlet (14) of the kiln (10). As for example, in a wet process, the precipitate could be transferred directly into the kiln by means of conventional piping and pump systems, or by means of any other transfer system known in the art. In a dry process, the precipitate will preferably be dried before being transferred to the kiln (10).

The plant also preferably comprises cleansing means, such as a filter (32), for cleansing the exhaust gas coming from the ciment chimney (19) of kiln (10). The filter (32) helps removing the CKD from the exhaust gas, which CDK may advantageously be used in the process for precipitating the $CaCO_3$. As apparent to any person in the art, in such a case, the plant (10) comprises means for transferring the exhaust gas from the kiln to the cleansing means, and means for transferring the clean exhaust gas from the cleansing means to the bioreactor (20). These transfer means may be, for example, any appropriate conduct systems.

Detailed Description of the Process

As defined above, and referring to FIG. 1, the process for producing cement clinker, comprising the steps of.
- a) providing a mixture of ground calcareous materials and ground argillaceous materials as defined above;
- b) heating the mixture of step a) to a temperature sufficient to calcine and fuse the ground materials to form the cement clinker, and thereby producing an exhaust gas containing $CO_2$;
- c) catalysing the hydration of at least a portion of the $CO_2$ contained in the exhaust gas and producing a solution containing bicarbonate ions and hydrogen ions; and
- d) adding to the solution obtained in step c) metal ions, and adjusting the pH of the solution to precipitate a carbonate of said metal.

The solution containing biocarbonate ions is preferably reacted with a solution containing Ca++ ions so to form $CaCO_3$ which can be recycled into the process as a first class raw material.

The temperature sufficient to calcine and fuse the materials to form cement clinker is 1400° C. or more, meaning substantially 1400° C. or more.

The current industrial process for cement production relies on the following chemical reactions:

$$CaCO_3 + \Delta \leftrightarrows CaO + CO_2$$

$$CaO + SiO_2 + \Delta \leftrightarrows Cement$$

The process initiates $CO_2$ emissions from three different sources: two from combustion and the other from the breakdown of $CaCO_3$ into CaO and $CO_2$. The proposed complementary process intends, first, to transform $CO_2$ according to the following bioreaction:

$$CO_2 + H_2O \text{ enzyme} \rightarrow H^+ + HCO_3^-$$

Secondly, to set a reaction between the ion $HCO_3^-$ and an ion such as calcium ($Ca^{2+}$) which can be found for example in calcium chloride ($CaCl_2$), CKD, sea salts or others $CaCO_3$ will precipitate easily in an aqueous solution containing $HCO_3^-$ and Ca++ ions.

Thirdly, this $CaCO_3$ can be used as first class raw material in the cement production process.

Estimates of the quantities involved are calculated using the molecular weights converted into tonnes.

| | $CO_{2\,(aq)} + H_2O$ enzyme $\rightarrow H^+ + HCO_3^-$ (bicarbonate) | | |
|---|---|---|---|
| tonnes: | 44 t | 18 t | 1 t 61 t |
| | $HCO_3^- \rightarrow CO_3^{2-} + H^+$ (Carbonate) | | |
| tonnes: | 61 t | 60 t | 1 t |
| | $CaCl_2 \rightarrow Ca^{2+} + 2\,Cl^-$ | | |
| tonnes: | 66 t | 40 t | 26 t |
| | $Ca^{2+} + CO_3^{2-} \rightarrow CaCO_3$ | | |
| tonnes: | 40 t | 60 t | 100 t |

The flow chart of FIG. 1 is more explicit in showing the main steps occurring in the cement production. The three $CO_2$ emissions are identified. Two important sources are related to the energy required to heat, while the other is due to the lime production (CaO). All these emissions proceed to the chimney stack (19).

Assuming the bioreactor (20) to be 100% efficient, 44 tonnes of $CO_2$ would produce 60 tonnes of carbonate ions. This amount of carbonate added to 66 tonnes of $CaCl_2$ could generate 100 tonnes of $CaCO_3$.

The enzymes used in the bioreactor could be any enzyme capable of catalysing the hydration of $CO_2$ into hydrogen ions and bicarbonate ions, for example, carbonic anhydrase or analogue thereof.

The calcium ions can be provided by using any chemical compound containing calcium and being capable of providing calcium ions in solution, for example, $CaCl_2$, sea salt, cement kiln dust or others.

Tables 2 and 3 show preliminary results of leaching essays performed on Cement Kiln Dust plant refuse and subsequent precipitation of bicarbonate ions by addition of filtered leachate. Analyses of major ion concentrations during the first leaching essay with 50 g of CKD in 500 ml water are shown in table 2. The most concentrated ions are potassium, calcium, sodium and chlorides, whereas aluminium, magnesium and baryum are weakly concentrated. A leaching pH of 12.33 allowed for recovery of a small portion of calcium present in the refuse. In spite of the calcite formation potential of this solution being 1.9 g calcite per liter, this cation dissolution potential may be increased by the variation of experimental parameters such as the pH, the temperature, the solid-liquid contact time and the solid concentration per unit of volume of water.

TABLE 2

Major ion concentrations in CDK refuse leachate

| Ions | Mole/L |
| --- | --- |
| K | 2.15E−01 |
| Ca | 1.90E−02 |
| Na | 2.30E−02 |
| Cl⁻ | 6.29E−02 |
| Al | 1.48E−05 |
| Mg | 1.67E−06 |
| Ba | 8.03E−06 |
| PH | 12.33 |

Further essays permitted to validate the precipitation potential of carbonate ions by the addition of refuse leachate to a sodium bicarbonate solution. In these essays, the pH of the leachate was not adjusted, rather, amounts of solids from the refuse were simply added in a volume of distilled water. The refuse added to water was mixed with agitation for two hours on a mechanical table agitator at room temperature of 22° C. Conductivity and pH measurements of the leachate were taken from samples before the precipitation step.

The following table shows the results of leaching essays by addition of 50, 100 and 500 g of CKD to 500 ml of pure water. Firstly, the final leaching pH of sample PR1 (50 g CKD/500 ml) was 12.56 and that of the previous essay with the same refuse:water ratio was 12.33. This could explain precipitation of the mass at 0.7 g/L which is slightly inferior to the 0.95 g/L precipitation potential of calcite (1.9 g/L/2; dilution factor) calculated according to the 0.019 mol Ca/L in the leachate. The solid mass increase in the volume of water (samples PR2 and PR3) allowed for an increase of the resulting precipitate mass although not in a proportional fashion. The very alcaline pH during leaching might explain this phenomenon. Even if the conductivity of sample PR3 is higher than for PR1 and PR2, the 0.25 g/L precipitate mass is much weaker than the others. Chemical analyses will allow characterization of solid samples. Finally, all samples showed an effervescence reaction upon addition of diluted hydrochloric acid, which indicates precipitation of carbonate ions. Electron microscopy analyses of the sample, as well as mineral identification through X-ray diffraction confirmed pure calcite precipitation into cubic crystals with an average edge or 5 $\mu$m.

TABLE 3

Results of preliminary refuse leaching and bicarbonate ion precipitation essays

| Sample No | CKD mass in 500 ml water | Conductivity of leachate mS/cm | pH of the leachate | $NaHCO_3$ concentration added mol/L | Mass of precipitate obtained g/L |
| --- | --- | --- | --- | --- | --- |
| PR1A | 50 | 37.2 | 12.56 | 0.25 | 0.712 |
| PR1B | 50 | 37.2 | 12.56 | 0.25 | 0.721 |
| PR1C | 50 | 37.2 | 12.56 | 0.25 | 0.724 |
| PR2A | 100 | 51.8 | 12.79 | 0.25 | 0.851 |
| PR2B | 100 | 51.8 | 12.79 | 0.25 | 0.826 |
| PR2C | 100 | 51.8 | 12.79 | 0.25 | 0.830 |
| PR3A | 500 | 94.6 | 13.13 | 0.25 | 0.247 |

Consequently, recovery of $CO_2$ from the fabrication of cement and its transformation into bicarbonate ions in an enzymatic reactor, followed by the bicarbonate ion precipitation into calcite, through addition of leached refuse from cement plants as a source of calcium, and integration of the calcite as raw matter into the cement fabrication process allows for the recovery of $CO_2$ responsible for the greenhouse effect and climatic changes. The perpetuel cycle of the present invention therefore allows the elimination of $CO_2$ emissions from cement plants into the atmosphere and the production of a reusable by-product in the cement fabrication process.

The precipitation of bicarbonate ions, resulting from the transformation of $CO_2$, may also be achieved by the addition of external chemical salts, such as calcium chloride, magnesium chloride, baryum chloride, sea salt etc,. Carbonated precipitates of these metals ($CaCO_3$-calcite, $MgCO_3$-magnesite, $BaCO_3$-witherite, $CaMg(CO_3)_2$—dolomite and others) were obtained in laboratory essays their optimal precipitation pH determined.

For example, calcite and witherite were obtained at a pH as low as 8 and the increase of pH did not affect the composition of the precipitate. The concentration in magnesite however is optimal at a pH between 10 and 11 only. Precipitation by addition of sea salt is optimal at pH 10 but tends to form hydroxocomplexes with available cations at very alcaline pH. The essays were carried out with solutions of 0.1 mol/L in cations and bicarbonates, which in theory correspond to 10 g/L calcite, 8.4 g/L magnesite and 19.7 g/L witherite.

Experimentation permitted to obtain up to 9.7 g/L calcite, 6.9 g/L magnesite and 19.4 g/L witherite. With sea salt, the maximal precipitate mass obtained was 5.3 g/L halite (NaCl) by evaporation during sample drying, hydromagnesite ($Mg_5(CO_3)_4(OH)_2.4H_2O$), dolomite ($CaMgCO_3)_2$ and aragonite ($CaCO_3$).

Also preferably, the process may comprise, prior to feeding the bioreactor with the $CO_2$ emissions, a treatment unit for purifying the $CO_2$ emissions and removing waste particles from the same, such as dust, etc.

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A process for producing cement clinker, comprising the steps of:
   a) providing a mixture of ground calcareous materials and ground argillaceous materials;
   b) heating the mixture of step a) to a temperature sufficient to calcine and fuse the ground materials to form the cement clinker, and thereby producing an exhaust gas containing $CO_2$;
   c) catalysing the hydration of at least a portion of the $CO_2$ contained in the exhaust gas and producing a solution containing bicarbonate ions and hydrogen ions; and
   d) adding to the solution obtained in step c) metal ions, and adjusting the pH of the solution to precipitate a carbonate of said metal.

2. A process as claimed in claim 1, wherein said hydration is performed in the presence of an enzyme capable of catalysing the hydration of dissolved $CO_2$ into hydrogen ions and bicarbonate ions.

3. A process as claimed in claim 1 wherein, the metal ions are $Ca^{++}$ and the carbonate is $CaCO_3$.

4. A process as claimed in claim 3, comprising, after step d), the step of:
   e) recycling the $CaCO_3$ obtained in step d) into the process by adding the $CaCO_3$ to the mixture of step a).

5. A process as claimed in claim 2, wherein the enzyme used in step c) is carbonic anhydrase or an analogue thereof.

6. A process as claimed in claim 5, wherein step c) comprises the steps of
   feeding liquid $H_2O$ and at least a portion of the exhaust gas into a bioreactor containing therein a reaction chamber filled with said carbonic anhydrase immobilized on a support.

7. A process as defined in claim 3, wherein the ions $Ca^{++}$ are obtained from the dissolution of a material selected from the group consisting of $CaCl_2$, cement kiln dust and sea salts.

8. A process as defined in claim 1, wherein the calcareous materials are selected from the group consisting of limestone, marine shells and marl.

9. A process as defined in claim 1 wherein the argillaceous materials are selected from the group consisting of clay, slate, sand, shale, and blast-furnace slags.

10. A process as claimed in claim 1, wherein the mixture of step a) further comprises one or more material selected form the group consisting of aluminium, iron and chemical admixture.

11. A process as claimed in claim 1, wherein the metal ions is selected from the group consisting of $Ca^{++}$, $Mg^{++}$, $Ba^{++}$, $CaMg^{++}$ and $Na^+$.

12. A process as claimed in claim 1, comprising, prior to step c) of hydration, the step of:
    cleansing the exhaust gas for removing waste particles.

13. A process as claimed in claim 1, wherein said temperature sufficient to calcine and fuse the ground materials is at least 1400° C.

14. A plant for producing cement clinker, comprising:
    a kiln for burning raw materials suitable for producing cement clinker, the kiln having an inlet for receiving the raw materials, an outlet for discharging the cement clinker and a gas outlet for discharging an exhaust gas containing $CO_2$;
    means for catalysing the hydration of the CO2 contained in the exhaust gas into bicarbonate ions and hydrogen ions;
    means for reacting the bicarbonate ions with metal ions to precipitate the carbonate of said metal.

15. A plant as claimed in claim 14, wherein said metal ions are $Ca^{++}$ and the carbonate is $CaCO_3$ and wherein the plant further comprises:
    means for transferring the precipitate $CaCO_3$ into the inlet of the kiln.

16. A plant as claimed in claim 14, wherein the means for catalysing the hydration of the $CO_2$ comprises a bioreactor comprising:
    a gas inlet for receiving at least a portion of the exhaust gas from the kiln;
    a liquid inlet for receiving an aqueous liquid,
    a reaction chamber in fluid communication with the gas inlet and the liquid inlet, the reaction chamber containing therein immobilized enzymes capable of catalysing the hydration of dissolved $CO_2$ into bicarbonate ions and hydrogen ions; and
    a liquid outlet in fluid communication with the reaction chamber for discharging a solution of bicarbonate ions and hydrogen ions.

17. A plant as claimed in claim 14, wherein the means for reacting the bicarbonate ions with metal ions is a reaction tank.

18. A plant as claimed in claim 14, comprising;
    cleansing means for cleansing the exhaust gas;
    means for transferring the exhaust gas from the kiln to the cleansing means; and
    means for transferring the clean exhaust gas from the cleansing means to the catalysing means.

* * * * *